US012782799B2

(12) United States Patent
Nakagomi

(10) Patent No.: US 12,782,799 B2
(45) Date of Patent: Nov. 3, 2026

(54) WAVELENGTH CONVERTER, WAVELENGTH CONVERSION DEVICE, LIGHT SOURCE DEVICE, PROJECTOR, AND METHOD OF MANUFACTURING WAVELENGTH CONVERTER

(71) Applicant: SEIKO EPSON CORPORATION, Tokyo (JP)

(72) Inventor: Yoichi Nakagomi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 353 days.

(21) Appl. No.: 18/539,740

(22) Filed: Dec. 14, 2023

(65) Prior Publication Data

US 2024/0201572 A1 Jun. 20, 2024

(30) Foreign Application Priority Data

Dec. 15, 2022 (JP) ................................ 2022-200020

(51) Int. Cl.
*G03B 21/20* (2006.01)
*F21K 9/64* (2016.01)

(52) U.S. Cl.
CPC .............. *G03B 21/204* (2013.01); *F21K 9/64* (2016.08); *G03B 21/206* (2013.01); *G03B 21/2066* (2013.01)

(58) Field of Classification Search
CPC ................ G03B 21/204; G03B 21/206; G03B 21/2066; G03B 21/16; F21K 9/64
USPC ........................................................... 353/84
See application file for complete search history.

(56) References Cited

U.S. PATENT DOCUMENTS

2012/0045634 A1 2/2012 Irie et al.
2019/0068936 A1* 2/2019 Takagi ................. G02B 27/141
2019/0075276 A1* 3/2019 Hashizume .......... H04N 9/3158
2019/0302587 A1* 10/2019 Shimizu ............... G03B 21/006
2020/0381597 A1 12/2020 Furuyama
(Continued)

FOREIGN PATENT DOCUMENTS

JP 2012-062459 A 3/2012
JP 2015-118107 A 6/2015
(Continued)

*Primary Examiner* — Magda Cruz
(74) *Attorney, Agent, or Firm* — Oliff PLC

(57) ABSTRACT

A wavelength converter includes: a wavelength conversion part having a first surface where first light enters and a second surface positioned at opposite side from first surface, and configured to convert the first light into second light; and a substrate configured to allow heat of wavelength conversion part to be transferred. The wavelength conversion part contains wavelength conversion particles excited by the first light to emit the second light, a filler having a heat conductivity higher than the wavelength conversion particles, and a binder holding the wavelength conversion particles and the filler. The wavelength conversion part includes a first wavelength conversion layer having the first surface and a second wavelength conversion layer having the second surface. The first wavelength conversion layer contains wavelength conversion particles and a binder, but does not contain a filler, and the second wavelength conversion layer contains the wavelength conversion particles, the filler, and the binder.

9 Claims, 5 Drawing Sheets

(56) References Cited

U.S. PATENT DOCUMENTS

| | | | | |
|---|---|---|---|---|
| 2021/0024818 | A1 | 1/2021 | Kito et al. | |
| 2021/0172583 | A1 | 6/2021 | Furuyama | |
| 2021/0208491 | A1 * | 7/2021 | Tanaka | F21V 9/40 |
| 2021/0270428 | A1 | 9/2021 | Ueda et al. | |
| 2022/0236631 | A1 | 7/2022 | Kito | |

FOREIGN PATENT DOCUMENTS

| | | | |
|---|---|---|---|
| JP | 2017-215507 | A | 12/2017 |
| JP | 2019-105826 | A | 6/2019 |
| JP | 2019-159308 | A | 9/2019 |
| JP | 2021-018340 | A | 2/2021 |
| JP | 2021-123640 | A | 8/2021 |
| JP | 2022-112948 | A | 8/2022 |
| WO | 2020/054192 | A1 | 3/2020 |

* cited by examiner

WAVELENGTH CONVERTER, WAVELENGTH CONVERSION DEVICE, LIGHT SOURCE DEVICE, PROJECTOR, AND METHOD OF MANUFACTURING WAVELENGTH CONVERTER

The present application is based on, and claims priority from JP Application Serial Number 2022-200020, filed Dec. 15, 2022, the disclosure of which is hereby incorporated by reference herein in its entirety.

BACKGROUND

1. Technical Field

The present disclosure relates to a wavelength converter, a wavelength conversion device, a light source device, a projector, and a method of manufacturing a wavelength converter.

2. Related Art

A light source device using fluorescence emitted from a phosphor when the phosphor is irradiated with excitation light emitted from a light emitting element is proposed to be a light source device for a projector.

The following JP-A-2019-159308 discloses a wavelength conversion part in which phosphor particles and heat conductive particles are dispersed in an inorganic binder. JP-A-2019-159308 discloses that by increasing a content of the heat conductive particles contained in the wavelength conversion part, heat generated from a phosphor is efficiently released to the outside via the heat conductive particles, and thus a temperature rise of the wavelength conversion part can be reduced.

However, when the wavelength conversion part contains the heat conductive particles as in JP-A-2019-159308, a ratio of the phosphor particles in the binder becomes relatively small, and thus there is a problem that wavelength conversion efficiency becomes low as compared with a case where the heat conductive particles are not contained. In addition, due to presence of the heat conductive particles that do not contribute to the wavelength conversion, scattering of generated fluorescence increases, and a loss of the fluorescence also increases. On the other hand, when the wavelength conversion part does not contain the heat conductive particles, it is difficult to release the heat generated in the wavelength conversion part, and thus, the temperature rise of the wavelength conversion part may cause failures such as a decrease in the wavelength conversion efficiency and breakage of the wavelength conversion part.

SUMMARY

In order to solve the above problems, a wavelength converter according to one aspect of the disclosure includes: a wavelength conversion part having a first surface where first light having a first wavelength band enters and a second surface positioned at an opposite side from the first surface, and configured to convert the first light into second light having a second wavelength band different from the first wavelength band; and a substrate thermally coupled to the second surface of the wavelength conversion part and configured to allow heat of the wavelength conversion part to be transferred. The wavelength conversion part contains a wavelength conversion particle to be excited by the first light to emit the second light, a filler having a heat conductivity higher than a heat conductivity of the wavelength conversion particle, and a binder holding the wavelength conversion particle and the filler. The wavelength conversion part includes a first wavelength conversion layer having the first surface and a second wavelength conversion layer having the second surface. The first wavelength conversion layer contains the wavelength conversion particle and the binder, and does not contain the filler, and the second wavelength conversion layer contains the wavelength conversion particle, the filler, and the binder.

A wavelength conversion device according to an aspect of the disclosure includes: the wavelength converter according to an aspect of the disclosure; and a motor configured to rotate the substrate about a rotation axis intersecting the first surface.

A light source device according to an aspect of the disclosure includes: the wavelength converter according to an aspect of the disclosure; and a light emitting element configured to emit the first light to enter the wavelength converter.

A light source device according to another aspect of the disclosure includes: the wavelength conversion device according to an aspect of the disclosure; and a light emitting element configured to emit the first light to enter the wavelength conversion device.

A projector according to an aspect of the disclosure includes: the light source device according to an aspect of the disclosure; a light modulation device configured to modulate light including the second light emitted from the light source device according to image information; and a projection optical device configured to project the light modulated by the light modulation device.

A method of manufacturing a wavelength converter according to an aspect of the disclosure is a method of manufacturing a wavelength converter, the wavelength converter including a wavelength conversion part containing a wavelength conversion particle configured to convert first light into second light, a filler having a heat conductivity higher than a heat conductivity of the wavelength conversion particles, and a binder holding the wavelength conversion particles and the filler, and a substrate thermally coupled to the wavelength conversion part, the method of manufacturing the wavelength converter including: forming a first wavelength conversion layer containing the wavelength conversion particle and the binder and not containing the filler; forming a second wavelength conversion layer containing the wavelength conversion particle, the filler, and the binder; forming the wavelength conversion part by laminating the first wavelength conversion layer and the second wavelength conversion layer and pressure-molding the laminated layers; and thermally coupling the second wavelength conversion layer of the wavelength conversion part to the substrate.

DESCRIPTION OF EMBODIMENTS

First Embodiment

Figure 1:
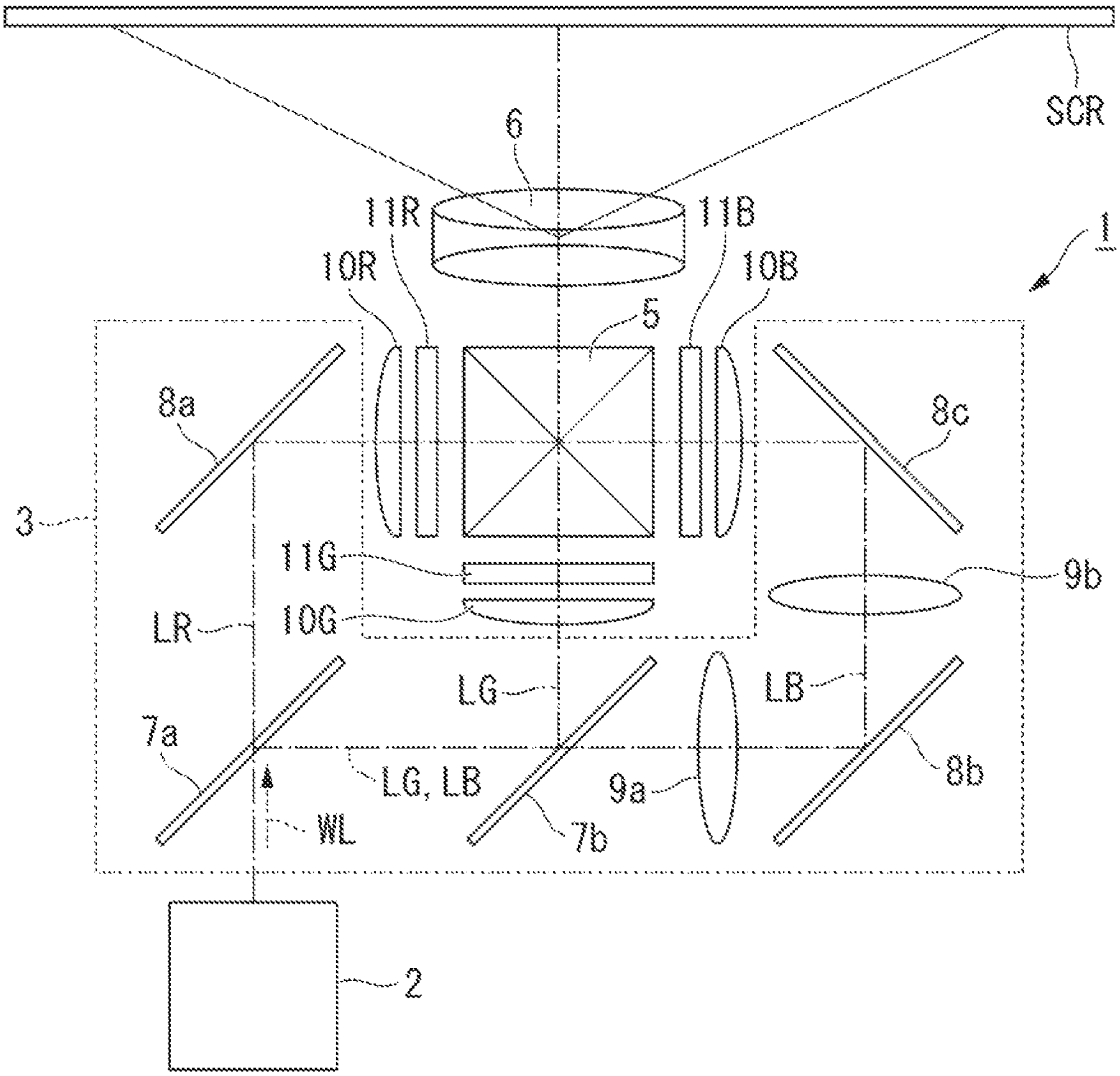
FIG. 1 is a schematic configuration diagram of a projector according to a first embodiment.

Hereinafter, a first embodiment of the disclosure will be described in detail with reference to the drawings.

In the drawings used in the following description, in order to make the features easier to understand, the features may be shown in an enlarged manner, and the dimensional ratios of the constituent elements may not be the same as the actual ones.

An example of a projector according to the embodiment will be described.

FIG. 1 is a schematic configuration diagram of a projector 1 according to the embodiment.

As shown in FIG. 1, the projector 1 according to the embodiment is a projection type image display device that displays a color image on a screen SCR. The projector 1 includes a light source device 2, a color separation optical system 3, a light modulation device 11R, a light modulation device 11G, a light modulation device 11B, a synthetic optical system 5, and a projection optical device 6.

The color separation optical system 3 separates illumination light WL into red light LR, green light LG, and blue light LB. The color separation optical system 3 includes a first dichroic mirror 7*a*, a second dichroic mirror 7*b*, a first reflection mirror 8*a*, a second reflection mirror 8*b*, a third reflection mirror 8*c*, a first relay lens 9*a*, and a second relay lens 9*b*.

The first dichroic mirror 7*a* separates the illumination light WL from the light source device 2 into the red light LR and light including the green light LG and the blue light LB. The first dichroic mirror 7*a* transmits the red light LR and reflects the light including the green light LG and the blue light LB. On the other hand, the second dichroic mirror 7*b* reflects the green light LG and transmits the blue light LB, thereby separating the light including the green light LG and the blue light LB into the green light LG and the blue light LB.

The first reflection mirror 8*a* is disposed in an optical path of the red light LR, and reflects the red light LR transmitted through the first dichroic mirror 7*a* toward the light modulation device 11R. The second reflection mirror 8*b* and the third reflection mirror 8*c* are disposed in an optical path of the blue light LB, and guide the blue light LB transmitted through the second dichroic mirror 7*b* to the light modulation device 11B. The second dichroic mirror 7*b* reflects the green light LG toward the light modulation device 11G.

The first relay lens 9*a* and the second relay lens 9*b* are disposed in a subsequent stage of the second dichroic mirror 7*b* in the optical path of the blue light LB.

The light modulation device 11R modulates the red light LR according to image information to form image light corresponding to the red light LR. The light modulation device 11G modulates the green light LG according to the image information to form image light corresponding to the green light LG. The light modulation device 11B modulates the blue light LB according to the image information to form image light corresponding to the blue light LB.

Each of the light modulation device 11R, the light modulation device 11G, and the light modulation device 11B is configured with a transmission type liquid crystal panel. A polarizing plate (not shown) is disposed on each of a light entering side and a light emitting side of the liquid crystal panel.

A field lens 10R for collimating the red light LR entering the light modulation device 11R is provided on the light entering side of the light modulation device 11R. Afield lens 10G for collimating the green light LG entering the light modulation device 11G is provided on the light entering side of the light modulation device 11G. A field lens 10B for collimating the blue light LB entering the light modulation device 11B is provided on the light entering side of the light modulation device 11B.

The image light emitted from each of the light modulation devices 11R, 11G, and 11B enters the synthetic optical system 5. The synthetic optical system 5 synthesizes the image light corresponding to each of the red light LR, the green light LG, and the blue light LB, and emits synthesized image light toward the projection optical device 6. The synthetic optical system 5 is implemented by a cross dichroic prism.

The projection optical device 6 includes a plurality of projection lenses. The projection optical device 6 enlarges the image light synthesized by the synthetic optical system 5 and projects the same toward the screen SCR. Accordingly, an enlarged color image is displayed on the screen SCR.

Hereinafter, the light source device 2 according to the embodiment will be described.

Figure 2:
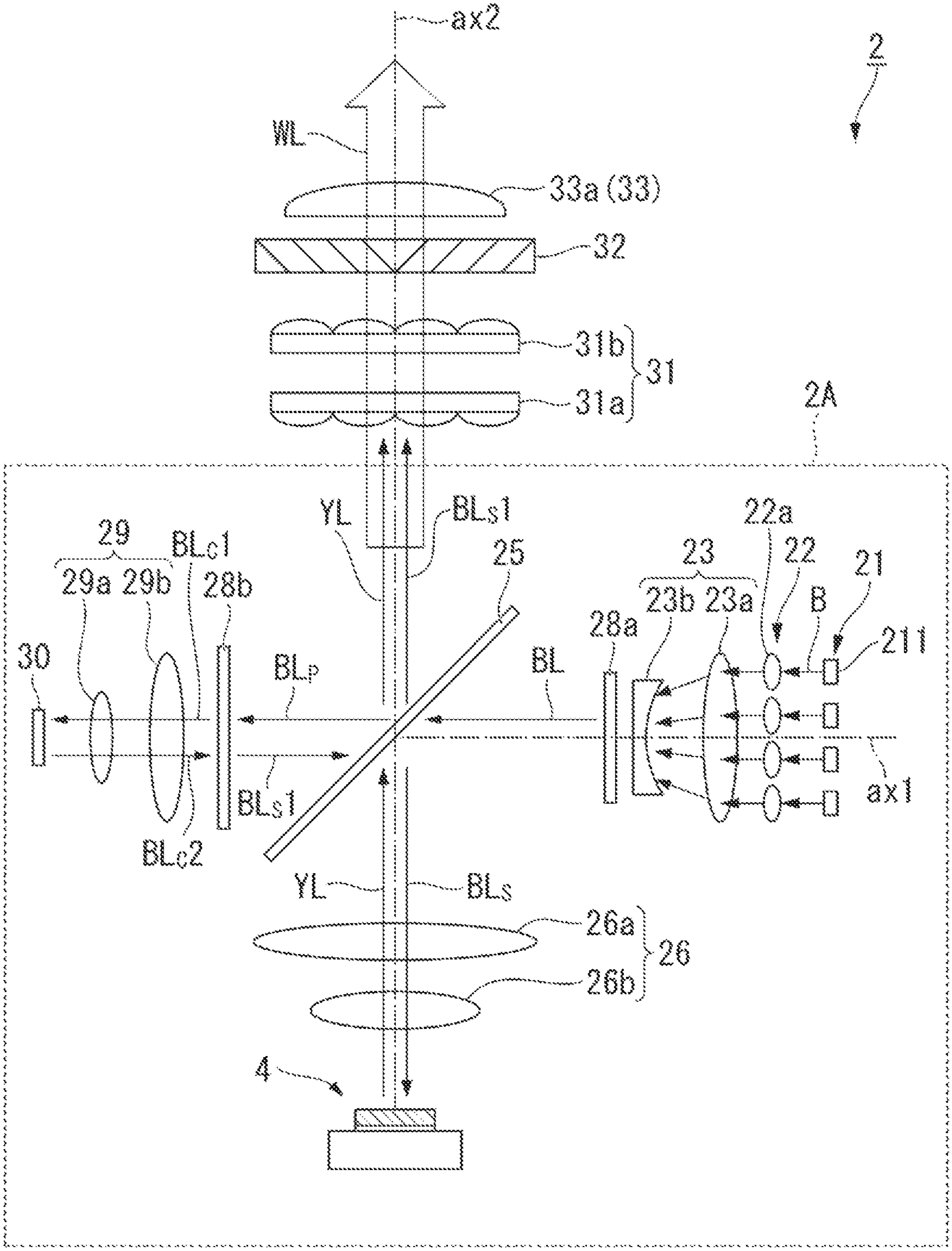
FIG. 2 is a schematic configuration diagram of a light source device according to the first embodiment.

FIG. 2 is a schematic configuration diagram of the light source device 2.

As shown in FIG. 2, the light source device 2 includes a light source unit 2A, an integrator optical system 31, a polarization converter 32, and a superimposing lens 33*a*. In the embodiment, the integrator optical system 31 and the superimposing lens 33*a* constitute a superimposing optical system 33. A center axis of the illumination light WL emitted from the light source device 2 is defined as an illumination optical axis ax2.

The light source unit 2A includes a light source 21, a collimator optical system 22, an afocal optical system 23, a first phase difference plate 28*a*, a polarization separation element 25, a first condensing optical system 26, a wavelength converter 4, a second phase difference plate 28*b*, a second condensing optical system 29, and a diffuse reflection element 30. A center axis of the blue light BL emitted from the light source 21 is defined as an optical axis ax1.

The light source 21, the collimator optical system 22, the afocal optical system 23, the first phase difference plate 28*a*, the polarization separation element 25, the second phase difference plate 28*b*, the second condensing optical system 29, and the diffuse reflection element 30 are sequentially disposed side by side on the optical axis ax1. The wavelength converter 4, the first condensing optical system 26, the polarization separation element 25, the integrator optical system 31, the polarization converter 32, and the superimposing lens 33*a* are sequentially disposed side by side on the illumination optical axis ax2. The optical axis ax1 and the illumination optical axis ax2 are in the same plane and are orthogonal to each other.

The light source 21 includes a plurality of light emitting elements 211. The plurality of light emitting elements 211 are disposed side by side in an array in a plane orthogonal to the optical axis ax1. The light emitting element 211 is configured with a semiconductor laser, and emits a blue light beam B having a first wavelength band corresponding to a blue wavelength band of 445 nm to 465 nm, for example. In this manner, the light source 21 emits the blue light BL including the plurality of blue light beams B. That is, the light emitting element 211 emits the blue light BL that is about to enter the wavelength converter 4. The blue light BL according to the embodiment corresponds to first light in the claims.

The blue light BL emitted from the light source 21 enters the collimator optical system 22. The collimator optical system 22 converts the blue light BL emitted from the light source 21 into collimated light. The collimator optical system 22 includes, for example, a plurality of collimator lenses 22*a* disposed side by side in an array. The plurality of collimator lenses 22*a* are disposed corresponding to the plurality of light emitting elements 211.

The blue light BL transmitted through the collimator optical system 22 enters the afocal optical system 23. The afocal optical system 23 adjusts a light beam diameter of the blue light BL. In the case of the embodiment, the afocal optical system 23 reduces the light beam diameter of the blue light BL. The afocal optical system 23 includes, for example, a convex lens 23*a* and a concave lens 23*b*.

The blue light BL transmitted through the afocal optical system 23 enters the first phase difference plate 28*a*. The first phase difference plate 28*a* is configured with, for example, a rotatable half-wavelength plate. The blue light BL emitted from the light source 21 is linearly polarized light having a predetermined polarization direction. By appropriately setting a rotation angle of the first phase difference plate 28*a*, the blue light BL transmitted through the first phase difference plate 28*a* can be converted into light including an S-polarized component and a P-polarized component at a predetermined ratio with respect to the polarization separation element 25 in a subsequent stage. By changing the rotation angle of the first phase difference plate 28*a*, the ratio of the S-polarized component and the P-polarized component can be changed.

The blue light BL including the S-polarized component and the P-polarized component generated by transmitting through the first phase difference plate 28*a* enters the polarization separation element 25. The polarization separation element 25 is configured with, for example, a polarization beam splitter having wavelength selectivity. The polarization separation element 25 is disposed to form an angle of 45° with respect to the optical axis ax1 and to the illumination optical axis ax2.

The polarization separation element 25 has a polarization separation function that separates the blue light BL into S-polarized component blue light BLs and P-polarized component blue light BLp with respect to the polarization separation element 25. Specifically, the polarization separation element 25 reflects the S-polarized component blue light BLs and transmits the P-polarized component blue light BLp. Further, the polarization separation element 25 has a color separation function of transmitting fluorescence YL having a wavelength band different from that of the blue light BL, regardless of a polarization state.

The S-polarized component blue light BLs emitted from the polarization separation element 25 enters the first condensing optical system 26. The first condensing optical system 26 condenses the blue light BLs toward the wavelength converter 4. The first condensing optical system 26 includes a first lens 26*a* and a second lens 26*b*. The number of lenses constituting the first condensing optical system 26 is not particularly limited. The blue light BLs emitted from the first condensing optical system 26 enters the wavelength converter 4 in a condensed state.

The fluorescence YL generated by the wavelength converter 4 is collimated by the first condensing optical system 26 and then enters the polarization separation element 25. The fluorescence YL transmits through the polarization separation element 25. The fluorescence YL according to the embodiment corresponds to second light in the claims. A configuration of the wavelength converter 4 will be described later in detail.

On the other hand, the P-polarized component blue light BLp emitted from the polarization separation element 25 enters the second phase difference plate 28*b*. The second phase difference plate 28*b* is disposed in an optical path between the polarization separation element 25 and the diffuse reflection element 30. The second phase difference plate 28*b* is configured with a quarter wavelength plate. Therefore, the P-polarized component blue light BLp emitted from the polarization separation element 25 is converted into, for example, clockwise circularly polarized blue light BLc1 by the second phase difference plate 28*b*, and then enters the second condensing optical system 29.

The second condensing optical system 29 includes a convex lens 29*a* and a convex lens 29*b*. The number of lenses constituting the second condensing optical system 29 is not particularly limited. The second condensing optical system 29 causes the blue light BLc1 to enter the diffuse reflection element 30 in the condensed state.

The diffuse reflection element 30 is disposed at an opposite side from the light source 21 with respect to the polarization separation element 25. The diffuse reflection element 30 diffusely reflects the blue light BLc1 emitted from the second condensing optical system 29 toward the polarization separation element 25. As the diffuse reflection element 30, it is preferable to use an element that Lambert-reflects the blue light BLc1 and does not disturb the polarization state.

Hereinafter, the light diffusely reflected by the diffuse reflection element 30 is referred to as blue light BLc2. According to the embodiment, the blue light BLc2 having a substantially uniform illuminance distribution is obtained by diffusely reflecting the blue light BLc1. The clockwise circularly polarized blue light BLc1 is reflected to become the counterclockwise circularly polarized blue light BLc2.

The blue light BLc2 is converted into collimated light by the second condensing optical system 29, and then enters the second phase difference plate 28*b* again. At this time, the counterclockwise circular polarized blue light BLc2 passes through the second phase difference plate 28*b* and is converted into S-polarized component blue light BLs1. The S-polarized component blue light BLs1 is reflected by the polarization separation element 25 toward the integrator optical system 31.

Accordingly, the blue light BLs1 together with the fluorescence YL transmitted through the polarization separation element 25 is used as the illumination light WL. That is, the blue light BLs1 and the fluorescence YL are emitted from the polarization separation element 25 toward the same direction, thereby generating the white illumination light WL obtained by synthesizing the blue light BLs1 and the yellow fluorescence YL.

The illumination light WL is emitted toward the integrator optical system 31. The integrator optical system 31 includes a first lens array 31*a* and a second lens array 31*b*. Each of the first lens array 31*a* and the second lens array 31*b* has a configuration in which a plurality of small lenses are arranged in an array.

The illumination light WL transmitted through the integrator optical system 31 enters the polarization converter 32.

The polarization converter 32 includes a polarization separation film and a phase difference plate. The polarization converter 32 converts the illumination light WL including the non-polarized fluorescence YL into linearly polarized light.

The illumination light WL transmitted through the polarization converter 32 enters the superimposing lens 33*a*. The superimposing lens 33*a* cooperates with the integrator optical system 31 to uniformize an illuminance distribution of the illumination light WL in an illuminated region. In this manner, the light source device 2 generates the illumination light WL.

Hereinafter, the wavelength converter 4 will be described.

Figure 3:
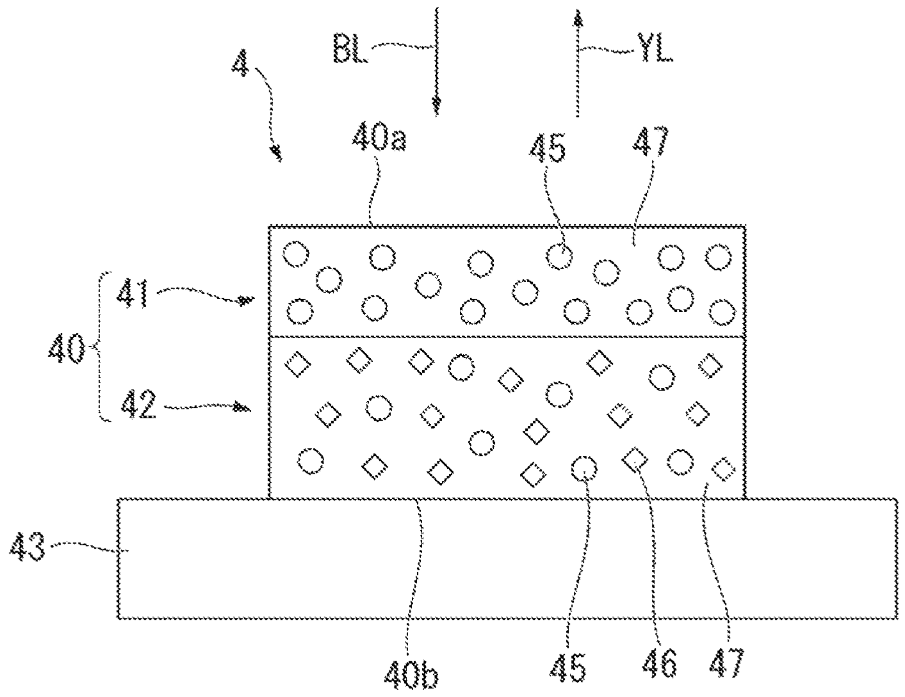
FIG. 3 is a schematic configuration diagram of a wavelength converter according to the first embodiment.

FIG. 3 is a schematic configuration diagram of the wavelength converter 4.

As shown in FIG. 3, the wavelength converter 4 includes a wavelength conversion part 40 and a substrate 43.

The wavelength conversion part 40 has a first surface 40*a* where the blue light BL enters, and a second surface 40*b* positioned at an opposite side from the first surface 40*a*. The wavelength conversion part 40 includes a first wavelength conversion layer 41 having the first surface 40*a* and a second wavelength conversion layer 42 having the second surface 40*b*. The wavelength conversion part 40 converts the blue light BL into the fluorescence YL.

The wavelength conversion part 40 contains a plurality of phosphor particles 45, a plurality of fillers 46, and a binder 47. The phosphor particles 45 according to the embodiment correspond to wavelength conversion particles in the claims.

The phosphor particles 45 are excited by the blue light BL and emit fluorescence YL having a second wavelength band different from the first wavelength band of the blue light BL. The second wavelength band of the fluorescence YL is, for example, a yellow wavelength band of 490 nm to 750 nm. That is, the fluorescence YL is yellow fluorescence including a red light component and a green light component. Specifically, a material of the phosphor particles 45 includes, for example, an yttrium aluminum garnet (YAG)-based phosphor. Taking YAG:Ce, which contains cerium (Ce) as an activator, as an example, a material in which raw material powders containing constituent elements such as $Y_2O_3$, $Al_2O_3$, and $CeO_3$ are mixed and subjected to a solid-phase reaction, Y—Al—O amorphous particles obtained by a wet method such as a coprecipitation method or a Solgel method, and YAG:Ce particles obtained by a vapor phase method such as a spray drying method, a flame thermal decomposition method, or a thermal plasma method are used as the phosphor particle 45.

The filler 46 has a heat conductivity higher than a heat conductivity of the phosphor particles 45. The filler 46 is formed of an inorganic material such as aluminum nitride (AlN), magnesium oxide (MgO), aluminum oxide ($Al_2O_3$), boron nitride (BN), or silicon carbide (SiC). A heat conductivity of the YAG:Ce phosphor is about 8 W/m·K, and a heat conductivity of the inorganic material described above is sufficiently higher than 8 W/m·K. For example, a heat conductivity of AlN is about 170 W/m·K to 230 W/m·K.

The binder 47 holds the phosphor particles 45 and the fillers 46. The binder is formed of, for example, glass or resin.

The substrate 43 is thermally coupled to the second surface 40*b* of the wavelength conversion part 40. That is, the substrate 43 is thermally coupled to the second wavelength conversion layer 42 of the wavelength conversion part 40. Specifically, the substrate 43 may be bonded to the second surface 40*b* of the wavelength conversion part 40 via a heat conductive bonding material (not shown) such as a nano silver paste. The substrate 43 is preferably formed of a material having a predetermined strength and a high heat conductivity. As the material of the substrate 43, for example, a metal such as copper, aluminum, or stainless steel is used. The substrate 43 is thermally coupled to the wavelength conversion part 40, so that heat of the wavelength conversion part 40 is transferred to the substrate 43. In order to further promote heat dissipation from the substrate 43, a heat dissipation member such as a heat sink or a fin may be coupled to the substrate 43. The substrate 43 reflects the fluorescence YL generated by the wavelength conversion part 40. Therefore, a surface of the substrate 43 facing the wavelength conversion part 40 preferably has a high reflectance.

As described above, the wavelength conversion part 40 contains the phosphor particles 45, the fillers 46, and the binder 47 as a whole. However, in the wavelength conversion part 40, the first wavelength conversion layer 41 contains the phosphor particles 45 and the binder 47, and does not contain the fillers 46. In contrast, the second wavelength conversion layer 42 contains the phosphor particles 45, the fillers 46, and the binder 47.

The present inventors focused on a fact that, when excitation light enters a wavelength conversion layer, in general, the excitation light is not uniformly subjected to the wavelength conversion in a depth direction, and most of the excitation light is subjected to the wavelength conversion in the vicinity of a light entering surface, and a small amount of the excitation light reaches a region away from the light entering surface. In view of the above, the present inventors have conceived of a configuration in which only the phosphor particles are contained in the binder on a side of a first surface where blue light serving as the excitation light enters, while the filler is not contained in the binder, and the phosphor particles and the filler are mixed in the binder on a side of a second surface thermally coupled to the substrate. That is, the present inventors have conceived of the configuration of the wavelength converter 4 according to the embodiment in which the wavelength conversion part 40 includes the first wavelength conversion layer 41 containing the phosphor particles 45 and the binder 47 and not containing the filler 46, and the second wavelength conversion layer 42 containing the phosphor particles 45, the filler 46, and the binder 47.

According to this configuration, since the first wavelength conversion layer 41 does not contain the filler 46, a ratio of the phosphor particles 45 in the binder 47 can be increased accordingly, and wavelength conversion efficiency can be improved. In addition, since scattering of the fluorescence YL caused by the filler 46 can be prevented, a loss of the fluorescence YL can be reduced. On the other hand, since the second wavelength conversion layer 42 contains the filler 46, the heat conductivity can be increased as compared with the first wavelength conversion layer 41 not containing the filler 46, and the heat generated in the wavelength conversion part 40 can be efficiently transferred to the substrate 43 and released to the outside.

As described above, the heat conductivity of YAG:Ce is about 8 W/m·K, and the heat conductivity of AlN is about 170 W/m·K to 230 W/m·K. According to a trial calculation performed by the present inventor, for example, when 50% of AlN in terms of volume ratio to YAG:Ce is added to the binder 47, the heat conductivity of the second wavelength conversion layer 42 can be increased to about 40 W/m·K. Further, since the second wavelength conversion layer 42 contains the phosphor particles 45 in addition to the filler 46, the blue light BL that cannot be completely converted by the first wavelength conversion layer 41 and enters the second wavelength conversion layer 42 can be converted into the fluorescence YL, which can contribute to improvement in the wavelength conversion efficiency. When AlN is used as the filler 46, an amount of the filler 46 is preferably 50% or more and less than 100% in terms of volume ratio with respect to the phosphor particles 45 of YAG:Ce.

Considering that the wavelength conversion occurs in the vicinity of the surface (first surface 40*a*) of the first wavelength conversion layer 41 and that a distance to the second wavelength conversion layer 42 is not too long so that heat is easily conducted, a thickness of the first wavelength conversion layer 41 is preferably 5 μm or more and 100 μm or less. Considering ease of heat transfer from the first wavelength conversion layer 41 to the substrate 43, a thickness of the second wavelength conversion layer 42 is preferably 5 μm or more and 100 μm or less. The thickness of the first wavelength conversion layer 41 may be the same as the thickness of the second wavelength conversion layer 42, but considering that the wavelength conversion occurs in an extremely surface layer of the wavelength conversion part 40, the thickness of the first wavelength conversion layer 41 may be smaller than the thickness of the second wavelength conversion layer 42.

A method of manufacturing the wavelength converter 4 according to the embodiment will be described below.

First, the first wavelength conversion layer 41 containing the phosphor particles 45 and the binder 47 but not containing the filler 46 is formed.

Next, the second wavelength conversion layer 42 containing the phosphor particles 45, the filler 46, and the binder 47 is formed. An order of forming the first wavelength conversion layer 41 and forming the second wavelength conversion layer 42 is not limited.

Next, the first wavelength conversion layer 41 and the second wavelength conversion layer 42 are stacked and pressure-molded using a press machine or the like to integrate the first wavelength conversion layer 41 and the second wavelength conversion layer 42, thereby forming the wavelength conversion part 40.

Next, the second wavelength conversion layer 42 of the wavelength conversion part 40 is bonded to the substrate 43 via the heat conductive bonding material such as a nano silver paste, and the second surface 40*b* of the wavelength conversion part 40 is thermally coupled to the substrate 43.

That is, the method of manufacturing the wavelength converter 4 according to the embodiment includes a step of forming the first wavelength conversion layer 41 containing the phosphor particles 45 and the binder 47 and not containing the filler 46, a step of forming the second wavelength conversion layer 42 containing the phosphor particles 45, the filler 46, and the binder 47, a step of forming the wavelength conversion part 40 by laminating and pressure-molding the first wavelength conversion layer 41 and the second wavelength conversion layer 42, and a step of thermally coupling the second wavelength conversion layer 42 of the wavelength conversion part 40 and the substrate 43.

Effects of First Embodiment

The wavelength converter 4 according to the embodiment includes the wavelength conversion part 40 that has the first surface 40*a* where the blue light BL enters and the second surface 40*b* positioned at an opposite side from the first surface 40*a* and that converts the blue light BL into the fluorescence YL, and the substrate 43 that is thermally coupled to the second surface 40*b* of the wavelength conversion part 40 and to which the heat of the wavelength conversion part 40 is transferred. The wavelength conversion part 40 contains the phosphor particles 45 that are excited by the blue light BL and emit the fluorescence YL, the filler 46 having a heat conductivity higher than the heat conductivity of the phosphor particles 45, and the binder 47 that holds the phosphor particles 45 and the filler 46. The wavelength conversion part 40 includes the first wavelength conversion layer 41 having the first surface 40*a* and the second wavelength conversion layer 42 having the second surface 40*b*. The first wavelength conversion layer 41 contains the phosphor particles 45 and the binder 47, but does not contain the filler 46, and the second wavelength conversion layer 42 contains the phosphor particles 45, the filler 46, and the binder 47.

According to the configuration of the embodiment, since the ratio of the phosphor particles 45 in the first wavelength conversion layer 41 in which the wavelength conversion is mainly performed can be relatively increased, high wavelength conversion efficiency can be secured. Further, since the heat conductivity of the second wavelength conversion layer 42, which is important for heat dissipation of the wavelength conversion part 40, can be increased, a temperature rise of the wavelength conversion part 40 can be prevented, and failures such as a decrease in wavelength conversion efficiency and breakage of the wavelength conversion part can be prevented.

Further, according to the method of manufacturing the wavelength converter 4 of the embodiment, the wavelength converter 4 having the above-described effects can be manufactured relatively easily.

The light source device 2 according to the embodiment includes the wavelength converter 4 according to the embodiment, and thus, utilization efficiency and reliability of the fluorescence YL are excellent.

Since the projector 1 according to the embodiment includes the light source device 2 according to the embodiment, a projector having high efficiency and high reliability can be implemented.

Second Embodiment

Hereinafter, a second embodiment of the disclosure will be described with reference to drawings.

Basic configurations of a projector and a light source device according to the second embodiment are substantially the same as those of the first embodiment, and a configuration of a wavelength converter is different from that of the first embodiment. Therefore, description of the projector and the light source device will be omitted.

Figure 4:
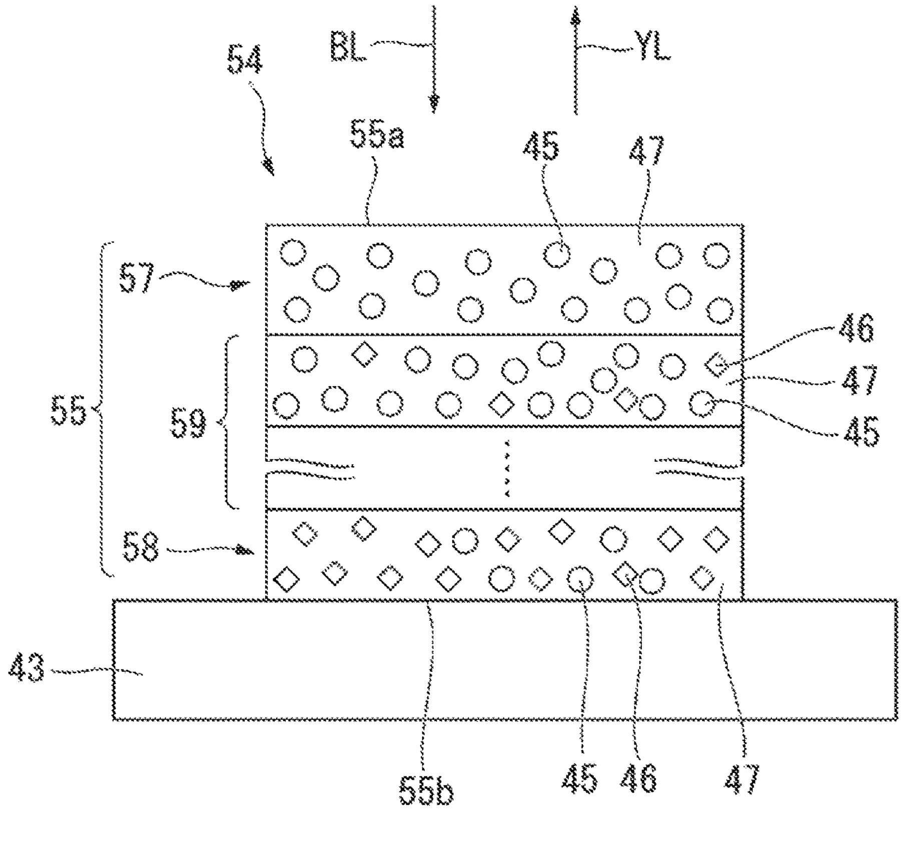
FIG. 4 is a schematic configuration diagram of a wavelength converter according to a second embodiment.

FIG. 4 is a schematic configuration diagram of a wavelength converter 54 according to the second embodiment.

In FIG. 4, the same components as those in the drawings used in the first embodiment are denoted by the same reference numerals, and the description thereof is omitted.

As shown in FIG. 4, the wavelength converter 54 according to the embodiment includes a wavelength conversion part 55 and the substrate 43.

The wavelength conversion part 55 has a first surface 55*a* where the blue light BL enters, and a second surface 55*b* positioned at an opposite side from the first surface 55*a*. The wavelength conversion part 55 includes a first wavelength conversion layer 57 having the first surface 55*a*, a second wavelength conversion layer 58 having the second surface 55*b*, and another wavelength conversion layer 59 provided between the first wavelength conversion layer 57 and the second wavelength conversion layer 58. That is, while the wavelength conversion part 40 according to the first embodiment includes the two wavelength conversion layers 41 and 42, the wavelength conversion part 55 according to the embodiment includes the three wavelength conversion layers 57, 58, and 59, or more. The number of another wavelength conversion layers 59 may be one or two or more.

In the another wavelength conversion layer 59, the ratio of the phosphor particles 45 contained in the binder 47 is lower than that in the first wavelength conversion layer 57 and higher than that in the second wavelength conversion layer 58. In the another wavelength conversion layer 59, the ratio of the filler 46 contained in the binder 47 is smaller than that in the second wavelength conversion layer 58. When the another wavelength conversion layer 59 is configured with two or more wavelength conversion layers, the ratio of the phosphor particles 45 contained in the binder 47 may sequentially decrease from a first wavelength conversion layer 57 side toward a second wavelength conversion layer 58 side, and the ratio of the filler 46 contained in the binder 47 may sequentially increase from the first wavelength conversion layer 57 side toward the second wavelength conversion layer 58 side.

In addition, the ratios of the phosphor particles 45 and the filler 46 may not necessarily change sequentially. For example, in two adjacent wavelength conversion layers included in the another wavelength conversion layer 59, the ratios of the phosphor particles 45 and the filler 46 may be the same. In either case, the mixing ratio of the phosphor particles 45 and the filler 46 is preferably adjusted, so that a wavelength conversion layer closer to the first wavelength conversion layer 57 side mainly contributes to the wavelength conversion and a wavelength conversion layer closer to the second wavelength conversion layer 58 side mainly contributes to the heat conduction. Other configurations of the wavelength converter 54 are the same as those of the wavelength converter 4 according to the first embodiment.

The thickness of each of the wavelength conversion layers 57, 58, and 59 is preferably 5 μm or more and 100 μm or less from the viewpoint of performance of the wavelength conversion and the heat conduction, the ease of the manufacturing process, and the like. A total thickness of the wavelength conversion part 55 is preferably 200 μm or less from the viewpoint of easy heat conduction.

Effects of Second Embodiment

In the wavelength converter 54 according to the embodiment, it is also possible to obtain the same effect as that of the first embodiment, that is, it is possible to secure high wavelength conversion efficiency by relatively increasing the ratio of the phosphor particles 45 of the first wavelength conversion layer 57, and it is possible to prevent, by increasing the heat conductivity of the second wavelength conversion layer 58, the failures such as a decrease in the wavelength conversion efficiency and the breakage of the wavelength conversion part due to the temperature rise of the wavelength conversion part 55.

Third Embodiment

Hereinafter, a third embodiment of the disclosure will be described with reference to drawings.

A basic configuration of a projector according to the third embodiment is similar to that of the first embodiment, and configurations of a light source device and a wavelength converter are different from those of the first embodiment. Therefore, description of the projector is omitted.

Figure 5:
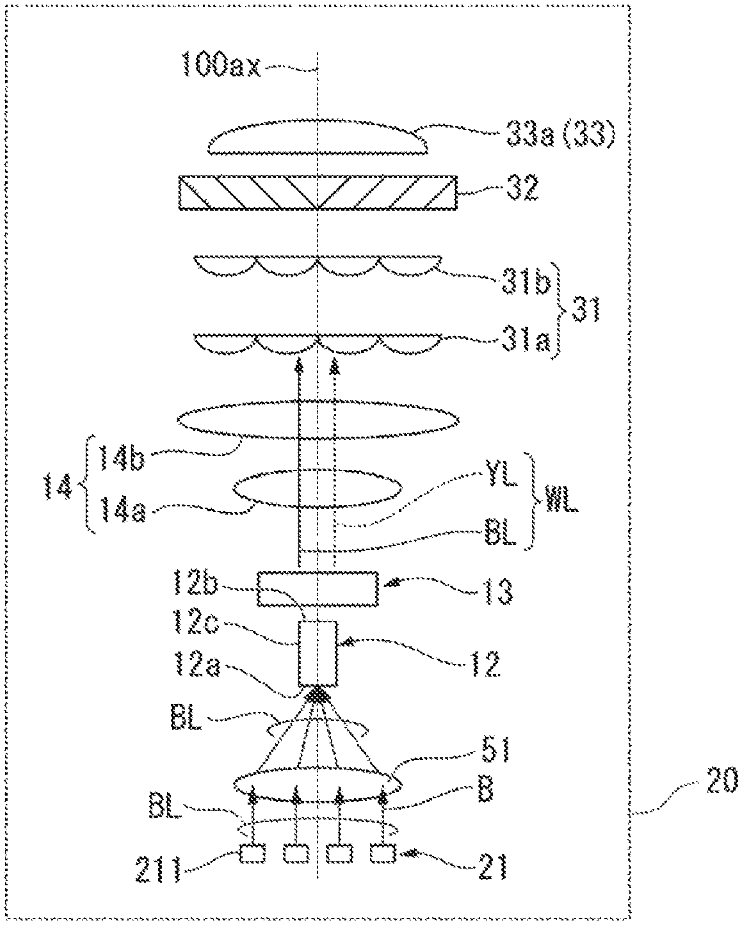
FIG. 5 is a schematic configuration diagram of a light source device according to a third embodiment.
Figure 6:
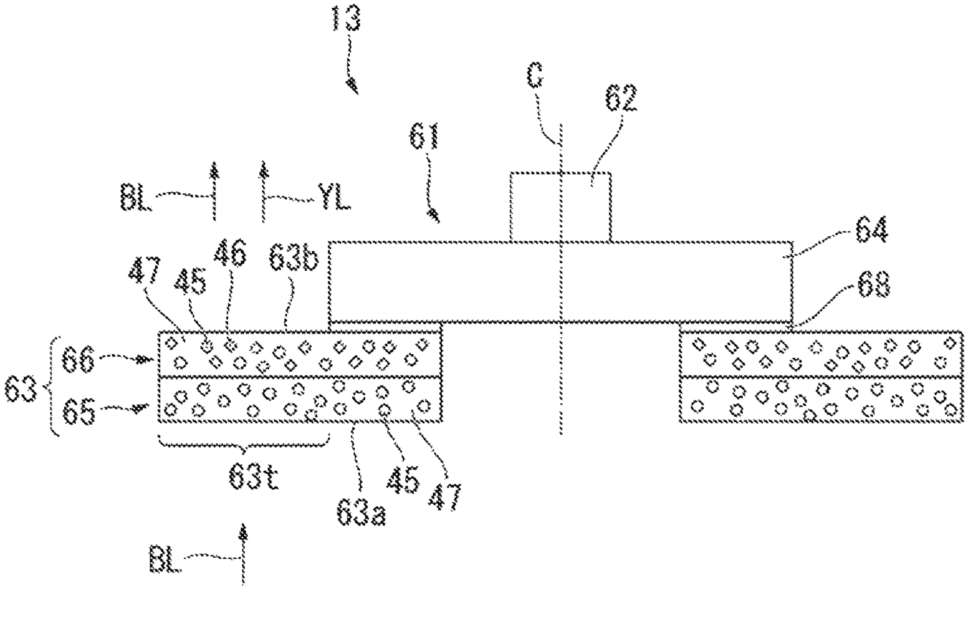
FIG. 6 is a schematic configuration diagram of a wavelength conversion device according to the third embodiment.

FIG. 5 is a schematic configuration diagram of a light source device 20 according to the third embodiment. FIG. 6 is a schematic configuration diagram of a wavelength conversion device 13 according to the third embodiment.

In FIGS. 5 and 6, the same components as those in the drawings used in the first embodiment are denoted by the same reference numerals, and the description thereof is omitted.

Hereinafter, the light source device 20 according to the embodiment will be described.

As shown in FIG. 5, the light source device 20 includes the light source 21, a condensing lens 51, a light guide 12, the wavelength conversion device 13, a pickup optical system 14, the integrator optical system 31, the polarization converter 32, and the superimposing lens 33*a*.

As in the first embodiment, the light source 21 includes the plurality of light emitting elements 211 formed of a semiconductive laser. The light source 21 emits the blue light BL having the first wavelength band toward the wavelength conversion device 13. The center axis of the blue light BL emitted from the light source 21 is defined as an optical axis 100*ax*.

The condensing lens 51 is provided on the light emitting side of the light source 21. The condensing lens 51 is configured with a convex lens. The condensing lens 51 condenses the blue light BL emitted from the light source 21 and causes the blue light BL to enter the light guide 12.

The light guide 12 has a light entering surface 12*a*, a light emitting surface 12*b*, and a side surface 12*c*. The light entering surface 12*a* is an end surface where the blue light BL condensed by the condensing lens 51 enters. The light emitting surface 12*b* is an end surface opposite from the light entering surface 12*a*, and is an end surface from which the blue light BL that propagates inside the light guide 12 emits. The side surface 12*c* is a surface intersecting with the light entering surface 12*a* and the light emitting surface 12*b*.

The light guide 12 propagates the blue light BL entering the inside of the light guide 12 from the light entering surface 12*a* by total reflection at the side surface 12*c*, and emits a part of the blue light BL from the light emitting surface 12*b*. The light guide 12 is configured with a rod lens extending in a long axis direction. The light guide 12 has a quadrangular prism shape in which a cross-sectional area orthogonal to the center axis does not change from the light entering surface 12*a* toward the light emitting surface 12*b*.

The light guide 12 is formed of a transparent member formed of, for example, borosilicate acid glass such as BK7, quartz, synthetic quartz, quartz crystal, or sapphire. The light guide 12 is formed of, for example, quartz having a characteristic of less absorbing the blue light BL. Accordingly, the light guide 12 can efficiently propagate the blue light BL and guide the blue light BL to the wavelength conversion device 13.

The blue light BL entered the light guide 12 propagates while being totally reflected inside the light guide 12, so as to be emitted from the light emitting surface 12*b* in a state where uniformity of the illuminance distribution is improved. The blue light BL in which the uniformity of the illuminance distribution is improved by the light guide 12 enters the wavelength conversion device 13. The wavelength conversion device 13 is excited by the blue light BL to generate and emit the fluorescence YL.

A part of the blue light BL entering the wavelength conversion device 13 transmits through the wavelength conversion device 13 and is emitted. That is, the wavelength conversion device 13 emits the white illumination light WL obtained by synthesizing the part of the blue light BL and the fluorescence YL. A configuration of the wavelength conversion device 13 will be described later.

The pickup optical system 14 includes a first lens 14*a* and a second lens 14*b*. The pickup optical system 14 substantially collimates the illumination light WL emitted from the wavelength conversion device 13. Each of the first lens 14*a* and the second lens 14*b* is configured with a convex lens. The number of lenses constituting the pickup optical system 14 is not particularly limited.

The configurations of the integrator optical system 31, the polarization converter 32, and the superimposing lens 33*a* are the same as those in the first embodiment.

Hereinafter, the wavelength conversion device 13 according to the embodiment will be described.

As shown in FIG. 6, the wavelength conversion device 13 includes a wavelength converter 61 and a motor 62. The wavelength converter 61 includes a wavelength conversion part 63 and a substrate 64. The motor 62 rotates the substrate 64 about a rotation axis C intersecting a first surface 63*a* of the wavelength conversion part 63.

The wavelength conversion part 63 has the first surface 63*a* where the blue light BL enters, and a second surface 63*b* positioned at an opposite side from the first surface 63*a*. The wavelength conversion part 63 includes a first wavelength conversion layer 65 having the first surface 63*a* and a second wavelength conversion layer 66 having the second surface 63*b*. The wavelength conversion part 63 contains the plurality of phosphor particles 45, the plurality of fillers 46, and the binder 47. The wavelength conversion part 63 converts a part of the blue light BL into the fluorescence YL. In the case of the embodiment, another part of the blue light BL not converted into the fluorescence YL is emitted from the wavelength conversion part 63.

The substrate 64 is thermally coupled to the second surface 63*b* of the wavelength conversion part 63. That is, the substrate 64 is thermally coupled to the second wavelength conversion layer 66 of the wavelength conversion part 63. Specifically, the substrate 64 is bonded to the second surface 63*b* of the wavelength conversion part 63 via a heat conductive bonding material 68 such as a nano silver paste. A heat dissipation member such as a heat sink or a fin may be coupled to the substrate 64.

When viewed from a direction of the rotation axis C, the substrate 64 has a circular shape, and the wavelength conversion part 63 has a circular ring shape. An outer diameter of the wavelength conversion part 63 is larger than an outer diameter of the substrate 64. Accordingly, the wavelength conversion part 63 includes a protruding portion 63*t* protruding outward from the substrate 64 along a direction intersecting the rotation axis C. The blue light BL enters the first surface 63*a* of the wavelength conversion part 63 at the protruding portion 63*t*. The fluorescence YL and the blue light BL not subjected to the wavelength conversion are emitted from the second surface 63*b* of the wavelength conversion part 63 at the protruding portion 63*t*.

In the embodiment, as in the first embodiment, the wavelength conversion part 63 also contains the phosphor particles 45, the filler 46, and the binder 47 as a whole. However, in the wavelength conversion part 63, the first wavelength conversion layer 65 contains the phosphor particles 45 and the binder 47, and does not contain the filler 46. On the other hand, the second wavelength conversion layer 66 contains the phosphor particles 45, the filler 46, and the binder 47.

Effects of Third Embodiment

In the wavelength conversion device 13 according to the embodiment, it is also possible to obtain the same effect as that of the first embodiment, that is, it is possible to secure high wavelength conversion efficiency by relatively increasing the ratio of the phosphor particles 45 of the first wavelength conversion layer 65, and it is possible to prevent, by increasing the heat conductivity of the second wavelength conversion layer 66, the failures such as a decrease in the wavelength conversion efficiency and the breakage of the wavelength conversion part due to the temperature rise of the wavelength conversion part 63.

In particular, in the case of the embodiment, since the wavelength converter 61 is rotated by the motor 62, heat dissipation performance is remarkably improved as compared with the first embodiment, and a temperature rise of the wavelength conversion part 63 can be effectively prevented.

Fourth Embodiment

Hereinafter, a fourth embodiment of the disclosure will be described with reference to drawings.

A basic configuration of a light source device according to the fourth embodiment is similar to that of the third embodiment, and a configuration of a wavelength conversion device is different from that of the third embodiment. Therefore, description of the light source device will be omitted.

Figure 7:
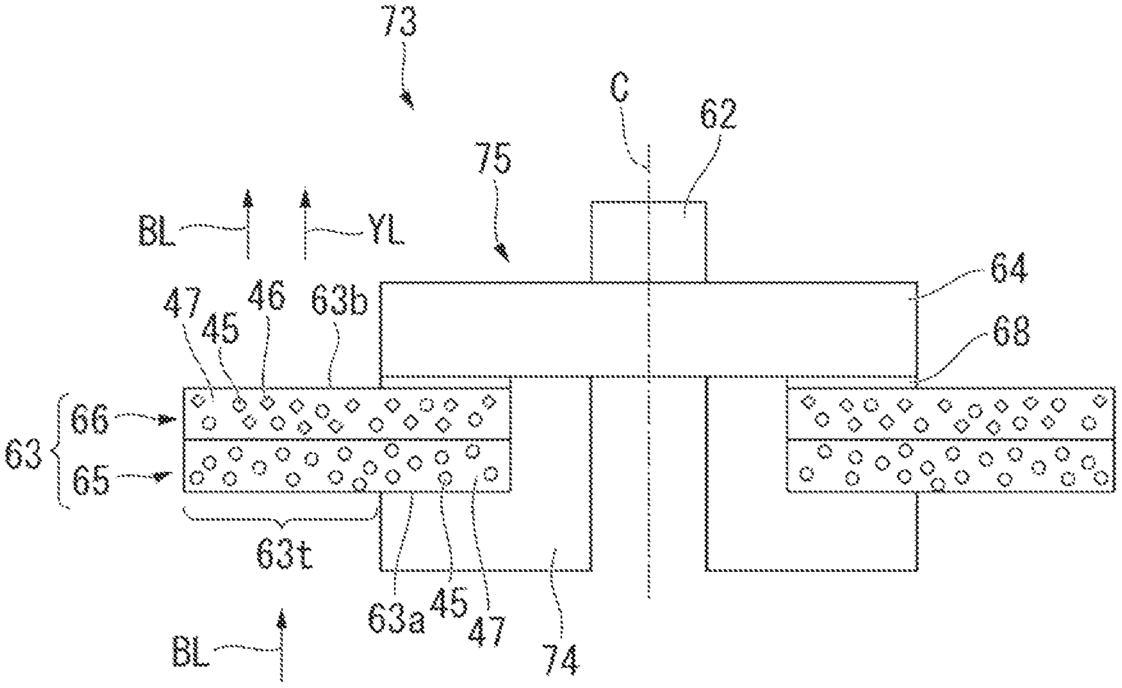
FIG. 7 is a schematic configuration diagram of a wavelength conversion device according to a fourth embodiment.

FIG. 7 is a schematic configuration diagram of a wavelength conversion device 73 according to the fourth embodiment.

In FIG. 7, the same components as those in the drawings used in the third embodiment are denoted by the same reference numerals, and the description thereof is omitted.

As shown in FIG. 7, the wavelength conversion device 73 according to the embodiment includes a wavelength converter 75 and a motor 62. The wavelength converter 75 includes a wavelength conversion part 63, a substrate 64, and a heat dissipation member 74.

When viewed from the direction of the rotation axis C, the heat dissipation member 74 has a circular ring shape. An inner peripheral side of the heat dissipation member 74 is thermally coupled to the substrate 64, and an outer peripheral side of the heat dissipation member 74 is thermally coupled to the first wavelength conversion layer 65 of the wavelength conversion part 63. Other configurations of the wavelength conversion device 73 are the same as those of the wavelength conversion device 13 according to the third embodiment.

Effects of Fourth Embodiment

In the wavelength conversion device 73 according to the embodiment, it is also possible to obtain the same effect as that of the first embodiment, that is, it is possible to secure high wavelength conversion efficiency by relatively increasing the ratio of the phosphor particles 45 of the first wavelength conversion layer 65, and it is possible to prevent, by increasing the heat conductivity of the second wavelength conversion layer 66, the failures such as a decrease in the wavelength conversion efficiency and the breakage of the wavelength conversion part due to the temperature rise of the wavelength conversion part 63.

In particular, in the case of the embodiment, the heat generated in the first wavelength conversion layer 65 is transferred to the substrate 64 via the second wavelength conversion layer 66, and is also directly transferred from the first wavelength conversion layer 65 to the heat dissipation member 74 so to be released to the outside. Accordingly, the temperature rise of the wavelength conversion part 63 can be prevented more effectively.

The technical scope of the disclosure is not limited to the above-described embodiment, and various modifications can be added without departing from the spirit of the disclosure. Further, one aspect of the disclosure may have a configuration obtained by appropriately combining the characteristic portions of the above-described embodiment and modifications. For example, in the first embodiment, an example of a reflective and fixed wavelength converter is described, and in the third embodiment, an example of a transmission type and rotary wheel type wavelength converter is described, but the wavelength converter may be a transmission type and fixed wavelength converter or may be a reflective and rotary wheel type wavelength converter.

In addition, the first wavelength conversion layer and the second wavelength conversion layer according to the disclosure hold the wavelength conversion particles and the filler by the binder, but the disclosure is not limited thereto, and the first wavelength conversion layer and the second wavelength conversion layer may be a so-called ceramic phosphor configured with an yttrium aluminum garnet (YAG)-based phosphor or configured with a phosphor matrix phase occupying most of the volume and a filler phase as a dispersed phase.

In the above case, the same effect as that of the first embodiment can be achieved by making, in a volume of the first wavelength conversion layer, a ratio of the phosphor matrix phase in the volume of the first wavelength conversion layer relatively larger than a ratio of the phosphor matrix phase in a volume of the second wavelength conversion layer, and making, in the volume of the second wavelength conversion layer, the ratio of the phosphor matrix phase in the volume of the second wavelength conversion layer relatively smaller than the ratio of the phosphor matrix phase in the volume of the first wavelength conversion layer.

Specific description of the shape, number, arrangement, material, and the like of each component of the wavelength converter, the wavelength conversion device, the light source device, and the projector is not limited to the above embodiments, and can be appropriately changed. In the above embodiment, an example in which the light source device according to the disclosure is mounted in the projector using the liquid crystal panel is described, but the disclosure is not limited thereto. The light source device according to the disclosure may be applied to a projector using a digital micro-mirror device as the light modulation device. In addition, the projector may not include a plurality of light modulation devices, and may include only one light modulation device.

In the above embodiments, an example in which the light source device according to the disclosure is applied to a projector is shown, and the disclosure is not limited thereto. The light source device according to the disclosure can also be applied to a luminaire, a headlight of an automobile, and the like.

CONCLUSION OF PRESENT DISCLOSURE

Hereinafter, a conclusion of the disclosure will be added.

Appendix 1

A wavelength converter includes:

a wavelength conversion part having a first surface where first light having a first wavelength band enters and a second surface positioned at an opposite side from the first surface, and configured to convert the first light into second light having a second wavelength band different from the first wavelength band; and a substrate thermally coupled to the second surface of the wavelength conversion part and configured to allow heat of the wavelength conversion part to be transferred, in which the wavelength conversion part contains a wavelength conversion particle to be excited by the first light to emit the second light, a filler having a heat conductivity higher than a heat conductivity of the wavelength conversion particle, and a binder holding the wavelength conversion particle and the filler, the wavelength conversion part includes a first wavelength conversion layer having the first surface and a second wavelength conversion layer having the second surface, the first wavelength conversion layer contains the wavelength conversion particle and the binder, and does not contain the filler, and the second wavelength conversion layer includes the wavelength conversion particle, the filler, and the binder.

According to the configuration in Appendix 1, it is possible to secure high wavelength conversion efficiency by relatively increasing the ratio of the phosphor particles of the first wavelength conversion layer, and it is possible to prevent, by increasing the heat conductivity of the second wavelength conversion layer, failures such as a decrease in wavelength conversion efficiency and breakage of the wavelength conversion part due to a temperature rise of the wavelength conversion part.

Appendix 2

A wavelength converter includes:

a wavelength conversion part having a first surface where first light having a first wavelength band enters and a second surface positioned at an opposite side from the first surface, and configured to convert the first light into second light having a second wavelength band different from the first wavelength band; and a substrate thermally coupled to the second surface of the wavelength conversion part and configured to allow heat of the wavelength conversion part to be transferred, in which the wavelength conversion part includes a matrix phase including a phosphor to be excited by the first light to emit the second light, and a filler phase including a filler having a heat conductivity higher than a heat conductivity of the matrix phase, the wavelength conversion part includes a first wavelength conversion layer having the first surface and a second wavelength conversion layer having the second surface, the first wavelength conversion layer includes the matrix phase and does not include the filler phase, and the second wavelength conversion layer includes the matrix phase and the filler phase.

Appendix 3

In the wavelength converter according to Appendix 1 or Appendix 2, the filler is formed of aluminum nitride.

According to the configuration of Appendix 3, the wavelength converter including the second wavelength conversion layer having a high heat conductivity can be implemented.

Appendix 4

In the wavelength converter according to Appendixes 1 to 3, a thickness of the first wavelength conversion layer is 5 μm or more and 100 μm or less, and a thickness of the second wavelength conversion layer is 5 μm or more and 100 μm or less.

According to the configuration of Appendix 4, it is possible to sufficiently ensure a heat dissipation property of the first wavelength conversion layer by optimizing a distance from the first surface to the second wavelength conversion layer while sufficiently exhibiting the wavelength conversion function of the first wavelength conversion layer. In addition, by optimizing the thickness of the second wavelength conversion layer while sufficiently exhibiting an auxiliary wavelength conversion function of the second wavelength conversion layer, a heat dissipation property of the second wavelength conversion layer can be sufficiently ensured.

Appendix 5

In the wavelength converter according to any one of Appendixes 1 to 4, a thickness of the first wavelength conversion layer is smaller than a thickness of the second wavelength conversion layer.

According to the configuration of Appendix 5, since the wavelength conversion is generally performed in close proximity to the light entering surface, the wavelength conversion function of the first wavelength conversion layer is not impaired, and heat is easily transferred to the second wavelength conversion layer.

Appendix 6

A wavelength conversion device includes:

the wavelength converter according to any one of Appendixes 1 to 5; and a motor configured to rotate the substrate about a rotation axis intersecting the first surface.

According to the configuration of Appendix 6, heat dissipation performance of the wavelength converter is remarkably improved, and a temperature rise of the wavelength conversion part can be effectively prevented.

Appendix 7

In the wavelength conversion device according to Appendix 6, the wavelength conversion part includes a protruding portion protruding outward from the substrate along a direction intersecting the rotation axis, the first light enters the first surface at the protruding portion, and the second light is emitted from the second surface at the protruding portion.

According to the configuration of Appendix 7, a transmission type wavelength conversion device can be implemented.

Appendix 8

A light source device includes:

the wavelength converter according to any one of Appendixes 1 to 5; and a light emitting element configured to emit the first light to enter the wavelength converter.

According to the configuration of Appendix 8, a light source device having excellent wavelength conversion efficiency and reliability can be implemented.

Appendix 9

A light source device includes:

the wavelength conversion device according to Appendix 6 or Appendix 7; and a light emitting element configured to emit the first light to enter the wavelength conversion device.

According to the configuration of Appendix 9, the light source device having excellent wavelength conversion efficiency and reliability can be implemented.

Appendix 10

A projector includes:

the light source device according to Appendix 8 or Appendix 9;

a light modulation device configured to modulate light including the second light emitted from the light source device according to image information; and a projection optical device configured to project the light modulated by the light modulation device.

According to the configuration of Appendix 10, a projector having high efficiency and high reliability can be implemented.

Appendix 11

A method of manufacturing a wavelength converter, the wavelength converter including a wavelength conversion part containing a wavelength conversion particle configured to convert first light into second light, a filler having a heat conductivity higher than a heat conductivity of the wavelength conversion particles, and a binder holding the wavelength conversion particles and the filler, and a substrate thermally coupled to the wavelength conversion part, the method of manufacturing the wavelength converter including:

forming a first wavelength conversion layer containing the wavelength conversion particle and the binder and not containing the filler;

forming a second wavelength conversion layer containing the wavelength conversion particle, the filler, and the binder;

forming the wavelength conversion part by stacking the first wavelength conversion layer and the second wavelength conversion layer and pressure-molding the stacked layers; and thermally coupling the second wavelength conversion layer of the wavelength conversion part to the substrate.

According to the configuration of Appendix 11, a wavelength converter having excellent wavelength conversion efficiency and reliability can be manufactured relatively easily.

What is claimed is:

1. A wavelength converter comprising:

a wavelength conversion part having a first surface where first light having a first wavelength band enters and a second surface positioned at an opposite side from the first surface, and configured to convert the first light into second light having a second wavelength band different from the first wavelength band; and a substrate thermally coupled to the second surface of the wavelength conversion part and configured to allow heat of the wavelength conversion part to be transferred, wherein the wavelength conversion part contains a wavelength conversion particle to be excited by the first light to emit the second light, a filler having a heat conductivity higher than a heat conductivity of the wavelength conversion particle, and a binder holding the wavelength conversion particle and the filler, the wavelength conversion part includes a first wavelength conversion layer having the first surface and a second wavelength conversion layer having the second surface, the first wavelength conversion layer contains the wavelength conversion particle and the binder, and does not contain the filler, and the second wavelength conversion layer contains the wavelength conversion particle, the filler, and the binder.

2. The wavelength converter according to claim 1, wherein the filler is formed of aluminum nitride.

3. The wavelength converter according to claim 1, wherein a thickness of the first wavelength conversion layer is 5 μm or more and 100 μm or less, and a thickness of the second wavelength conversion layer is 5 μm or more and 100 μm or less.

4. The wavelength converter according to claim 1, wherein a thickness of the first wavelength conversion layer is smaller than a thickness of the second wavelength conversion layer.

5. A wavelength conversion device comprising:

the wavelength converter according to claim 1; and a motor configured to rotate the substrate about a rotation axis intersecting the first surface.

6. The wavelength converter according to claim 5, wherein the wavelength conversion part includes a protruding portion protruding outward from the substrate along a direction intersecting the rotation axis, the first light enters the first surface at the protruding portion, and the second light is emitted from the second surface at the protruding portion.

7. A light source device comprising:

the wavelength conversion device according to claim 5; and a light emitting element configured to emit the first light to enter the wavelength conversion device.

8. A light source device comprising:

the wavelength converter according to claim 1; and a light emitting element configured to emit the first light to enter the wavelength converter.

9. A projector comprising:

the light source device according to claim 8;

a light modulation device configured to modulate light including the second light emitted from the light source device according to image information; and a projection optical device configured to project the light modulated by the light modulation device.

* * * * *